United States Patent Office 3,704,153
Patented Nov. 28, 1972

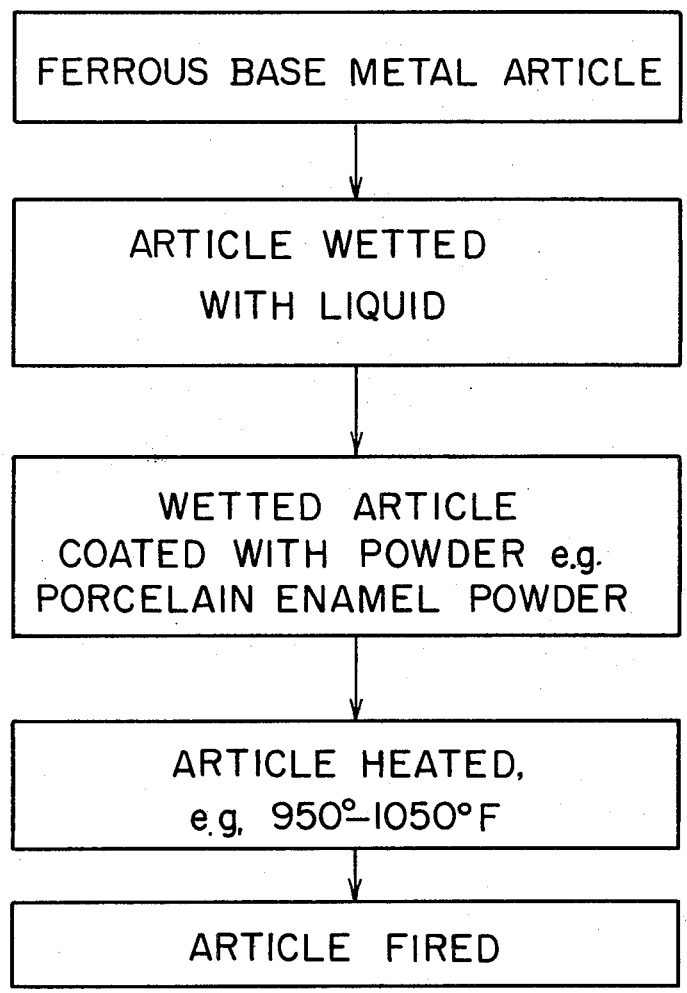

3,704,153
PROCESS FOR ENAMELING FERROUS ARTICLES
Jerome J. Kanter, Palos Park, Ill., assignor to
Crane Co., Chicago, Ill.
Continuation of applications Ser. No. 624,905, Mar. 21, 1967, and Ser. No. 654,438, July 19, 1967. This application May 9, 1969, Ser. No. 823,319
Int. Cl. C23d 5/00
U.S. Cl. 117—23                                       14 Claims

ABSTRACT OF THE DISCLOSURE

The process relates to improvements in the enameling of ferrous articles. The surfaces to be enameled are wetted with a liquid and enamel powder is supplied to the wetted surfaces to form a bisque. The bisque is baked, and the articles thereafter fired.

CROSS REFERENCE TO RELATED APPLICATION

This application is a continuation of application Ser. No. 654,438, filed July 19, 1967, now abandoned, and Ser. No. 624,905, filed Mar. 21, 1967, now abandoned.

BACKGROUND OF THE INVENTION

Porcelain enamel compositions are applied to metal surfaces for firing or thermal fusion thereon by two common methods known as the "wet process" and the "dry process."

By way of illustration the wet process has been employed commercially for manufacturing the porcelain enamel coating of sheet steel, and the dry process for porcelain enamel coating of heavy cast iron pieces.

In the wet process, the powdered porcelain enamel composition is suspended in water so that it may be applied to the ware by dipping or spraying. After dipping or spraying the ware is dried to form a bisque of the porcelain enamel, and then it is fired to fuse and bond the enamel to the ware.

In the dry process, the ware is heated and powdered glass enamel is dusted thereon. The heat in the ware initiates the fusion of the enamel, and the fusion is completed by firing in a furnace. The dry process is used following the wet process. For example, in enameling cast iron, a ground coat is applied by the wet process, fired in the furnace, the ware removed from the furnace, and while the enamel composition remains fused, dusted with powdered glass or frit of a cover coating in sufficient thickness by a skilled operator to hide surface imperfection in the ground coating and then refired.

The use of the wet process to apply a cover coating has been restricted ordinarily to comparatively smooth surfaces due to the relatively thin layer of enamel coating which may be applied by this technique. The suspension of the enamel composition in water necessarily requires a small particle size of enamel which results in the relatively thin coating that, in many instances, is not able to hide the surface irregularities, such as the types that occur on cast iron. Moreover, the water dispersion of the particles comprising a slurry is so great that upon drying the resulting bisque has contracted to a degree so as to leave a network of cracks. When such a bisque is fired, a variegated surface results showing the network of cracks. In some cases the wet process encounters difficulties by the formation of blisters, cracks, and pinholes in the coating arising from the entrainment of air in spray, too much water or by a dense coating.

In other cases, the viscosity of the slurry or slip follows the irregularities, pits, indentations of the ware, so that the finished product reproduces, and sometimes emphasizes, defects of the surface to be coated. For those reasons, the wet process has been limited, and although many attempts have been made to employ a single coat wet process to, for example, coating cast iron, it has not met with general commercial acceptance for this purpose.

For these reasons wet enameling is used primarily on sheet metal and pressed metal ware, as, for instance in the manufacture of stoves and appliances. In the wet enameling process a ground coat is generally applied as a slurry of glass particles with clay in water. The slurry is then fired in a furnace. The ware is removed from the furnace, cooled and a second coating is applied by a slurry, generally in a spray. The article is then refired.

In the manufacture of enameled cast iron ware, such as bath tubs, various attempts have been made to apply the enamel composition as a water slurry. One of the principal difficulties encountered in the use of a water slurry is the rough surface that is characteristic of cast iron that contains pits, indentations, and other irregularities. The slurry necessarily is maintained at a sufficiently low viscosity for easy application, which, unfortunately, causes the slurry to follow such irreguarities of the cast iron surface, so that the finished product reproduces, and sometimes amplifies, the poor cast iron surface. It is, of course, desirable to cover the surface irregularities, and this has been accomplished heretofore on cast iron by a "dry process" in which the finished coat composition is dusted on hot ware. The powdered glass or frit can be dusted on of sufficient thickness in the dry process to hide the surface imperfections and seal off graphite and carbides from the cover coat.

SUMMARY OF THE INVENTION

It is, accordingly, an object of the present invention to provide a process for producing improved coatings for ferrous base metal articles. It is another object of the invention to provide a novel method for forming a bisque in a process of the enamel coating. It is still another object of the invention to provide a coating of improved adherence to cast iron. It is yet another object of the invention to provide coatings having improved structural advantages and uses. It is yet another object of the invention to provide coatings of increased thickness. It is a further object of the invention to provide a finished article by a single coating of cast iron, and to eliminate the ground coating.

It is a further object to provide a bisque which is self-limiting in thickness. It is still further object of the invention to provide bisque that is adaptable to decorative techniques. It is yet a further object of the invention to reduce the labor and cost of enameling ferrous articles. It is a still further object of the invention to provide a process in which certain steps can be automated. Other objects of my invention will appear as the description proceeds.

To the accomplishment of the foregoing related ends, said invention then comprises the features hereinafter fully described and particularly pointed out in the claims, the following description setting forth in detail certain illustrative embodiments of the invention, these being indicative, however, of but a few of the various ways in which the principles of the invention may be employed.

BRIEF DESCRIPTION OF THE DRAWING

The sole figure of the drawing is a flow sheet of one illustrative embodiment of the process of the invention.

DESCRIPTION OF THE PREFERRED EMBODIMENTS

Briefly stated, the present invention is directed to the formation and treatment of an adherent bisque of enameling powder on metal surfaces preparatory to firing.

The bisque is used to coat or treat the metal surface, for example, in enameling, the bisque is heated to temperatures to fuse the bisque. The bisque is formed by wetting the surface with liquid. The enamel powder composition is applied to the wetted surface to form a bisque. The bisque is then baked. After the baking, the article is fired.

Referring to the flow sheet of the drawing, the preferred steps of the invention are illustrated. The articles to be coated are ferrous pieces, for example, ferrous base metals, such as cast iron or steel.

The articles to be coated, for example, cast iron pieces to be enameled, may be cast into their ultimate shapes, or they may be cast into several separate parts designed for assembly into a single unitary article, and, after such assembly, cemented together. The adherent enamel coatings of the invention provide, in many instances, sufficient structural strength for cementing, so that the articles may be assembled from several pieces, and cemented together, as they are coated by the process hereinafter described, and thereby formed into an integral article.

Prior to coating, the surfaces to be treated may be first prepared, such as by sand blasting. Scratches and wrinkles can be removed by abrasive wheels and discs.

The surface area to be coated is first wetted or moistened, as by dipping or spraying, with a liquid, for example, water, oils, or water-oil emulsions or salt solutions of the foregoing. Many different liquids may be used that will adhere to the metal surface and to the powder in order to form the bisque. The liquid must be volatile below about 1050° F., so that the volatile components can be removed before firing, as described hereinafter. It is desirable that the liquid so used be free from contaminants that may produce unwanted defects in the finished coating.

The preferred liquid is water. It is desirable in many instances to improve the adherence of the bisque to the metal by including salts in a liquid solvent. The salts preferable should dissolve in the solvent, for example, water, without decomposition, and should crystallize upon evaporation of the liquid phase. The salts also preferable should not decompose or volatilize during subsequent treatment steps; for example, in the formation of an enamel coating, the salts desirable should not produce volatile materials in the range of the fusion temperatures of the bisque, such as at temperatures in the range from about 1300° F. to 1600° F. Suitable metal salts for use in the liquid solution comprise the inorganic metal salts, including the alkali metal and alkaline earth metal chlorides, such as sodium chloride, potassium chloride, calcium chloride, magnesium chloride; the alkali metal chromates, such as sodium chromate; sodium aluminate, the metal nitrates, such as aluminum nitrate, chromium nitrate, nickel nitrate, cerium nitrate, and the like. Although the nitrate salts decompose yielding oxygen and nitrogen, their decomposition is completed well below fusion of the enamel, so as to reduce the possibility of blistering and pinholing. It will be realized that the foregoing salts are not equally effective, or desirable, and special preference may be given to certain salts, especially for particular applications. Mixtures of salts may be useful. A convenient solvent for the salts is water, although other solvents may be used, and an aqueous salt solution is preferred.

In many instances, it is desirable that the solution be colorless, and sodium chloride, calcium chloride, and magnesium chloride, for example, meet this objective.

In other instances, it is desirable to introduce inorganic salts that will color the water and serve as a dye. A red colored solution, for example, may be helpful in applying the powder composition to indicate areas which have not been dusted with sufficient material to cover the aqueous solution.

The metal salt may be used in a wide range of concentrations from traces to saturation of the aqueous solutions usually in the range from about 1% to 10% by weight, and often at about 5% by weight. The optimum concentration depends upon the particular metal salt and the conditions employed in the process.

Oil and water-oil emulsions that are volatile at temperatures below 1050° F. are also suitable liquid components for forming the bisque on the metal surface.

Following the wetting of the surface with a liquid, the wetted surface is dusted with an enamel powder composition, for example, porcelain enamel, to form a bisque. Alternatively, a "pre-coat" process may be used. In the pre-coat process the salt solution is dried to deposit the salt evenly over the area to be coated or treated. The surface is again wetted, such as with pure water, and then coated with the powder composition to form the bisque.

The enamel powder composition is applied to the wetted surface in sufficient thickness to cover the desired area. The dusting operation is conducted at temperatures below the volatile point of the liquid component of the composition, and preferable at ordinary room temperatures. The powder adheres to the moistened surface to form a bisque. Additional liquid may be supplied to build up the thickness of the bisque.

Various modifications may be made in forming the bisque. The composition may be moistened before application to the wetted surface. During the dusting operation moisture may be supplied with the powder as it is deposited on the ware.

Sufficient liquid is supplied to the bisque to cause the particles to adhere to the surface of ware and to cohere together in the desired thickness. The amount of liquid component in the bisque, however, is maintained below that amount which would cause the powder composition to flow as a fluid.

Although in many cases it will be preferable to perform as separate steps first wetting of the surface of the article and then dusting with powder, in other cases it may be desirable to perform the wetting operation substantially simultaneously with the application of the powder. The present invention, therefore, contemplates the moistening of the surface of the article and the application of a damp powder in a single, as well as in separate opeartions.

Suitable enameling compositions for application as powders in accordance with the process of the invention includes compositions which have been heretofore regarded as cover coatings in enameling of cast iron. Examples of typical enamel compositions are set forth hereinbelow:

EXAMPLE 1

| White coat: | Percent by wt. |
|---|---|
| Borax | 28.60 |
| Silica | 24.80 |
| Cryolite | 20.30 |
| Soda nitrate | 2.30 |
| Soda ash | 4.10 |
| Fluorspar | 2.30 |
| Litharge | 11.30 |
| Antimony oxide | 6.30 |

EXAMPLE 2

| Acid-resisting white coat: | Percent by wt. |
|---|---|
| Potash feldspar | 8.70 |
| Borax | 11.60 |
| Silica | 25.80 |
| Soda nitrate | 5.10 |
| Soda ash | 14.30 |
| Sodium antimonate | 10.10 |
| Sodium silico fluoride | 1.70 |
| Litharge | 7.80 |
| Zinc oxide | 5.10 |
| Whiting | 3.00 |
| Titanium oxide | 6.80 |

The particle size of the composition is not critical. Typical sizes are in the range from the fine particles that will pass 200 mesh to the coarser particles that will pass 60 mesh screen.

It has been discovered necessary to the success of the process that the bisque be heated prior to firing. The heating step removes the liquid component of, and bakes, the bisque in advance of firing. This heating step is performed by heating at temperatures and for times sufficient to remove volatile materials, such as water, carbon dioxide, organic substances, and the like. For example, the bisque is heated at temperatures to about 1050° F., usually in the range from about 950° F. to about 1050° F., for about five minutes in advance of the firing.

Prior to firing the face of the bisque may be compressed with a die. This has been found to shorten the flow-out time.

The firing of the article is at temperatures sufficiently high to fuse the coating. The process of the present invention permits lower firing temperatures with many attendant advantages. Firing temperatures may range from about 1100° F. to about 1500° F., and ordinarily range from about 1350° F. to about 1450° F. for approximately ten minutes. The firing temperature desirably is maintained below that point at which brown spotting occurs, which is caused by reaction between the iron and the enamel composition. The optimum firing temperature is at about 1365° F. The temperature and time are also desirably maintained below that which produces substantial growth of the ferrous article, and, in the case of cast iron, below the transformation point which begins in the range from 1350° F. to 1400° F.

After firing, the ware ordinarily is cooled directly to the finished product. The cooling is conducted usually at a sufficiently gradual rate to prevent cracking.

Alternatively, the process of the present invention permits, prior to cooling, special effects to be produced. For example, before the article is cooled, decals or artistic material may be superimposed on the fused composition. Decals that are made for firing onto china are satisfactory. After placement of the decorative materials, the article is re-fired, usually at the firing temperatures given above, and then allowed to cool.

The following example sets forth preferred embodiment of the invention. It is furnished by way of illustration and not as a limitation to the invention.

EXAMPLE 3

A cast iron bath tub preparatory to enameling was sand blasted. A water mist spray was applied to wet the surface to be enameled. The wetted surface was dusted with the composition of Example 1 with a hand sifter to form an adherent bisque. The article was heated at 1000° F. for five minutes, and immediately thereafter fired at 1385° F. for ten minutes. The article was allowed to cool.

The finished article had appearance noticeably improved over the enameled ware produced by conventional processes.

There are many unusual advantages in coating the cast iron articles in accordance with the foregoing procedures. Not only is the ground coat eliminated, and the coating achieved in a single step, but the finished coating is more adherent to the cast iron surface than obtained heretofore. Further, the bisque is denser, which aids fusion and flow-out and reduces cracking of the bisque upon drying. The lower firing temperatures reduces defects produced by brown spotting and blistering. The article can be re-fired which allows the employment of special effects.

The use of salt solutions, as described hereinabove, in some instances improves acid resistance of the enamel, for example, addition of sodium aluminate, and calcium and magnesium salts to the salt solution. In the case of the pre-coat process, the bisque has better flow-out in less time during the firing operation. Furthermore, the finished article appears to possess fewer brown spots, a defect which is caused by certain properties of the iron surface.

In the case of applying a bisque to steel ware the salt containing solution has the beneficial tendency of providing a self-limiting thickness to the bisque, so that it does not become too thick and spall off.

In the drawing and specification there has been set forth a preferred embodiment of the invention, and although specific terms are employed, these are used in a generic and descriptive sense only, and not for purpose of limitation. Changes in form and proportion of parts, as well as substitution of equivalents are contemplated, as circumstances may suggest or render expedient, without departing from the spirit or scope of this invention as further defined in the following claims:

I claim:

1. In a process for procelain enameling ferrous base metal articles in a single coating, and which is adapted to apply a finished white porcelain coating directly on a cast iron surface in a single application, the steps comprising:

wetting the surface of a cast iron article with an adherent liquid over the area to be coated, said liquid volatile at temperatures below 1050° F. in order that all the volatile components thereof may be removed before firing, said liquid selected from the class consisting of water, oil, oil-water emulsions, and inorganic salt solutions of the foregoing;

dusting a porcelain enamel powder composition containing thermally fusible components on said wetted surface to form a bisque thereon with said liquid;

said liquid contained in said bisque in amounts sufficient to cause the composition particles to adhere to the surface of the article and in amounts below that amount which would cause the powder composition to flow as a fluid;

said liquid free from materials that produce volatile substances in the range of the fusion temperatures of said bisque which will cause defects in the finished coating;

heating said bisque at temperatures in the range from about 950° F. to about 1050° F. and for a sufficient time to remove the volatile components and to bake the bisque prior to firing; and thereafter firing at temperatures and a time sufficiently high to fuse said porelain enamel composition and sufficiently low to maintain the cast iron article below the transformation point that produces substantial growth of the iron at temperatures below 1500° F.

2. In a process according to claim 1 in which said powder composition contains at least 20% by weight of silica.

3. In a process according to claim 1 in which said liquid comprises water.

4. In a process according to claim 1 in which said liquid comprises oil.

5. In a process according to claim 1 in which said liquid comprises a water-oil emulsion.

6. In a process according to claim 1 in which said liquid comprises a solution containing at least one metal salt.

7. In a process according to claim 6 in which said metal salt is an inorganic metal salt.

8. In a process according to claim 6 in which said solution is an aqueous solution.

9. In a process according to claim 6 in which said salt solution contains at least one alkali metal chloride.

10. In a process according to claim 1 in which prior to cooling decorative materials are applied to said coating and the article re-fired.

11. The process according to claim 1 in which said liquid is a water solution of at least one metal chromate.

12. The process according to claim 1 in which said liquid is a water solution of at least one metal aluminate.

13. The process according to claim 1 in which said liquid is a water solution of at least one metal nitrate.

14. The process according to claim 1 in which said firing temperature is in the range from 1350° F. to 1450° F.

References Cited

UNITED STATES PATENTS

| | | | |
|---|---|---|---|
| 1,819,816 | 8/1931 | Hommel | 117—53 X |
| 1,827,223 | 10/1931 | Dennis | 117—53 X |
| 2,004,632 | 6/1935 | Martin | 117—129 X |
| 2,022,434 | 11/1935 | Rosenberg | 117—53 X |
| 2,226,913 | 12/1940 | Schlegel | 117—70 X |
| 2,683,672 | 7/1954 | Chester | 117—53 |
| 2,940,865 | 6/1960 | Sullivan | 117—23 |
| 3,141,753 | 7/1964 | Certa | 117—53 |
| 3,278,324 | 10/1966 | Nelson | 117—23 |
| 11,815 | 10/1954 | Thomin et al. | 117—23 |
| 806,153 | 12/1905 | Kohler | 117—23 |
| 2,952,558 | 9/1960 | Tafel | 117—23 |
| 3,481,757 | 12/1969 | Van Dolah et al. | 117—23 |

FOREIGN PATENTS

| | | | |
|---|---|---|---|
| 2,539 | 10/1856 | Great Britain | 117—23 |
| 12,437 | 6/1849 | Great Britain | 117—23 |
| 307,674 | 3/1929 | Great Britain. | |

OTHER REFERENCES

Krebs: Ser. No. 126,308, filed Apr. 30, 1972, U.S. Class 117—23.

Thomin et al.: Ser. No. 11,815, filed Oct. 17, 1954, U.S. Class 117—23.

WILLIAM D. MARTIN, Primary Examiner

S. L. CHILDS, Assistant Examiner

U.S. Cl. X.R.

117—129